(12) United States Patent
Ghosh et al.

(10) Patent No.: US 9,024,476 B2
(45) Date of Patent: May 5, 2015

(54) SINGLE-BATTERY POWER TOPOLOGIES FOR ONLINE UPS SYSTEMS

(75) Inventors: Rajesh Ghosh, Bangalore (IN); Mahendrakumar Lipare, Bangalore (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 774 days.

(21) Appl. No.: 13/192,682

(22) Filed: Jul. 28, 2011

(65) Prior Publication Data

US 2013/0026835 A1  Jan. 31, 2013

(51) Int. Cl.
*H02J 1/00* (2006.01)
*H02J 9/06* (2006.01)
*H02M 1/10* (2006.01)

(52) U.S. Cl.
CPC . *H02J 9/062* (2013.01); *H02M 1/10* (2013.01)
USPC ............................................. 307/66; 307/85

(58) Field of Classification Search
USPC ..................................................... 307/66, 85
See application file for complete search history.

(56) References Cited

U.S. PATENT DOCUMENTS

| | | | | |
|---|---|---|---|---|
| 4,823,247 A * | 4/1989 | Tamoto | ............................ | 363/16 |
| 5,241,217 A * | 8/1993 | Severinsky | ...................... | 307/64 |
| 5,519,306 A * | 5/1996 | Itoh et al. | ...................... | 323/222 |
| 6,285,178 B1 * | 9/2001 | Ball et al. | ...................... | 323/351 |
| 6,483,730 B2 * | 11/2002 | Johnson, Jr. | .................. | 363/123 |
| 6,661,678 B2 * | 12/2003 | Raddi et al. | ...................... | 363/37 |
| 6,853,097 B2 * | 2/2005 | Matsuda et al. | ................ | 307/66 |
| 6,944,035 B2 * | 9/2005 | Raddi et al. | ...................... | 363/37 |
| 7,012,825 B2 * | 3/2006 | Nielsen | .......................... | 363/142 |
| 7,402,921 B2 | 7/2008 | Ingemi et al. | | |
| 7,705,489 B2 | 4/2010 | Nielsen et al. | | |
| 7,759,900 B2 | 7/2010 | Samstad | | |
| 8,143,744 B2 * | 3/2012 | Nielsen et al. | .................. | 307/66 |
| 8,492,928 B2 * | 7/2013 | Pyboyina et al. | ............... | 307/85 |
| 8,698,354 B2 | 4/2014 | Ghosh et al. | | |
| 2004/0213022 A1 * | 10/2004 | Raddi et al. | ...................... | 363/37 |
| 2006/0238941 A1 * | 10/2006 | Ingemi et al. | ................... | 361/92 |

(Continued)

FOREIGN PATENT DOCUMENTS

| | | |
|---|---|---|
| CN | 1304201 A | 7/2001 |
| CN | 101699698 A | 4/2010 |

(Continued)

OTHER PUBLICATIONS

Notification of Transmittal of the International Search Report and the Written Opinion of the International Searching Authority from corresponding PCT/US2012/048341 mailed Jun. 3, 2013.

*Primary Examiner* — Daniel Cavallari
(74) *Attorney, Agent, or Firm* — Lando & Anastasi, LLP

(57) ABSTRACT

A power converter includes a first power input to receive AC input power, a second power input to receive backup power, a first DC bus configured to provide a positive DC output voltage, a second DC bus configured to provide a negative DC output voltage, and a power conversion circuit coupled to the first DC bus and the second DC bus. The power conversion circuit has an inductor, a first switch device coupled in series with the inductor, a second switch device coupled in series with the first switch device, and a bypass relay coupled in parallel with the second switch device. The power conversion circuit is switchably coupled to the first power input and the second power input, and is operable to charge the inductor and generate the positive and negative DC output voltages.

15 Claims, 17 Drawing Sheets

(56) References Cited

U.S. PATENT DOCUMENTS

| | | | |
|---|---|---|---|
| 2008/0067872 A1* | 3/2008 | Moth | 307/66 |
| 2010/0054002 A1* | 3/2010 | Lu et al. | 363/37 |
| 2013/0026836 A1 | 1/2013 | Dighrasker et al. | |
| 2013/0027126 A1 | 1/2013 | Jayaraman et al. | |
| 2013/0049699 A1 | 2/2013 | Jayaraman et al. | |
| 2014/0103725 A1* | 4/2014 | Ghosh et al. | 307/64 |

FOREIGN PATENT DOCUMENTS

| | | |
|---|---|---|
| GB | 2 287 843 A | 9/1995 |
| JP | 05 328712 A | 12/1993 |
| JP | 07 87731 A | 3/1995 |
| JP | 07 115773 A | 5/1995 |
| JP | 2000 060115 A | 2/2000 |
| JP | 2000 358378 A | 12/2000 |
| WO | 2010/131348 A1 | 11/2010 |

* cited by examiner

SINGLE-BATTERY POWER TOPOLOGIES FOR ONLINE UPS SYSTEMS

BACKGROUND OF THE INVENTION

1. Field of Invention

Embodiments of the invention relate generally to power conversion, and more particularly, to generating an output voltage from an input voltage in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 and 20 kVA for several hours.

A UPS unit typically includes one or more batteries as a power source when AC mains power is unavailable. DC power provided by the battery is converted to AC power by a power converter circuit, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

SUMMARY OF THE INVENTION

According to one embodiment, a power converter includes a first power input to receive AC input power, a second power input to receive backup power, a first DC bus configured to provide a positive DC output voltage, a second DC bus configured to provide a negative DC output voltage, and a power conversion circuit coupled to the first DC bus and the second DC bus. The power conversion circuit has an inductor, a first switch device coupled in series with the inductor, a second switch device coupled in series with the first switch device, and a bypass relay coupled in parallel with the second switch device. The power conversion circuit is switchably coupled to the first power input and the second power input, and is operable to charge the inductor and generate the positive and negative DC output voltages. The power conversion circuit is configured to, in a line mode of operation and during a positive portion of the AC input power, charge the inductor through a first current path of the power conversion circuit that includes the first switch device, the second switch device, the first power input and the inductor. The power conversion circuit is further configured to, in the line mode of operation and during a negative portion of the AC input power, charge the inductor through a second current path of the power conversion circuit that includes the first switch device, the second switch device, the first power input and the inductor. The power conversion circuit is further configured to, in a backup mode of operation, generate the negative DC output voltage through a third current path of the power conversion circuit that includes the second power input, the inductor, the first switch device and the bypass relay, wherein the third current path bypasses the second switch device through the bypass relay.

In another embodiment, the power conversion circuit may include a boost converter circuit operable to transfer power stored in the inductor to the first DC bus and the second DC bus. In another embodiment, the power converter may include a neutral input, a third switch device coupled to the inductor. The power conversion circuit may be further configured to, in the backup mode of operation, charge the inductor through a fourth current path of the power conversion circuit that includes the inductor and the third switch device. In yet another embodiment, the power converter may include a fourth switch device coupled to the neutral input. The power conversion circuit may be further configured to generate the positive DC output voltage through a fifth current path of the power conversion circuit that includes the inductor and the fourth switch.

In another embodiment, the power converter may include a battery coupled to the second power input. In yet another embodiment, the power converter may include a battery charging circuit coupled to the battery, the first DC bus and the second DC bus. The battery charging circuit may be configured to charge the battery from the first DC bus and/or the second DC bus.

In another embodiment, the inductor is a first inductor, and the battery charging circuit may include a second inductor coupled between the battery and the first DC bus and/or the second DC bus.

In another embodiment, the power converter may include a DC-AC inverter circuit coupled to the first DC bus and the second DC bus. The power converter may be configured to convert the positive DC output voltage and the negative DC output voltage into an AC output voltage.

According to one embodiment, a power converter includes a first power input to receive AC input power, a second power input to receive backup power, a power output to provide a positive DC output voltage and a negative DC output voltage each derived from the AC input power and/or the backup power, an inductor switchably coupled to the first power input and the second power input, and means for generating the positive DC output voltage and the negative DC output voltage using energy stored in the inductor.

In another embodiment, the power converter may include a battery coupled to the second power input. In yet another embodiment, the power converter may include means for charging the battery using the positive DC output voltage and/or the negative DC output voltage.

In another embodiment, the power converter may include a first switch device coupled in series with the inductor, a second switch device coupled in series with the first switch device, and a bypass relay coupled in parallel with the second switch device. The bypass relay may be configured to bypass the second switch device in a backup mode of operation.

According to one embodiment, a method of providing power to a load includes detecting a presence of AC input power from a primary power source. In response to detecting the presence of the AC input power and during a positive portion of the AC input power, the method further includes storing energy from the primary power source in an inductor through a first current path of a power conversion circuit that includes a first switch device, a second switch device, and the inductor. In response to detecting the presence of the AC input power and during a negative portion of the AC input power, the method includes storing energy from the primary power source in the inductor through a second current path of the power conversion circuit that includes a first switch device, a second switch device and the inductor. The method further includes detecting a loss of the AC input power from the primary power source. In response to detecting the loss of the AC input power, the method further includes closing a bypass relay coupled in parallel to the second switch device to bypass the second switch device. In response to detecting the loss of the AC input power, the method further includes storing energy from a secondary power source in the inductor, and converting the energy stored in the inductor to a negative DC output voltage through a third current path of the power conversion circuit that excludes the second switch device.

In another embodiment, the method may include, responsive to detecting the loss of the AC input power, storing energy from the secondary power source in the inductor, and converting the energy stored in the inductor to a positive DC output voltage through a fourth current path of the power conversion circuit that excludes the first switch device and the second switch device.

In another embodiment, the power conversion circuit may include a first boost converter circuit and a second boost converter circuit. The method may include converting power stored in the inductor into a positive DC output voltage using the first boost converter circuit and converting the power stored in the inductor into a negative DC output voltage using the second boost converter circuit.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
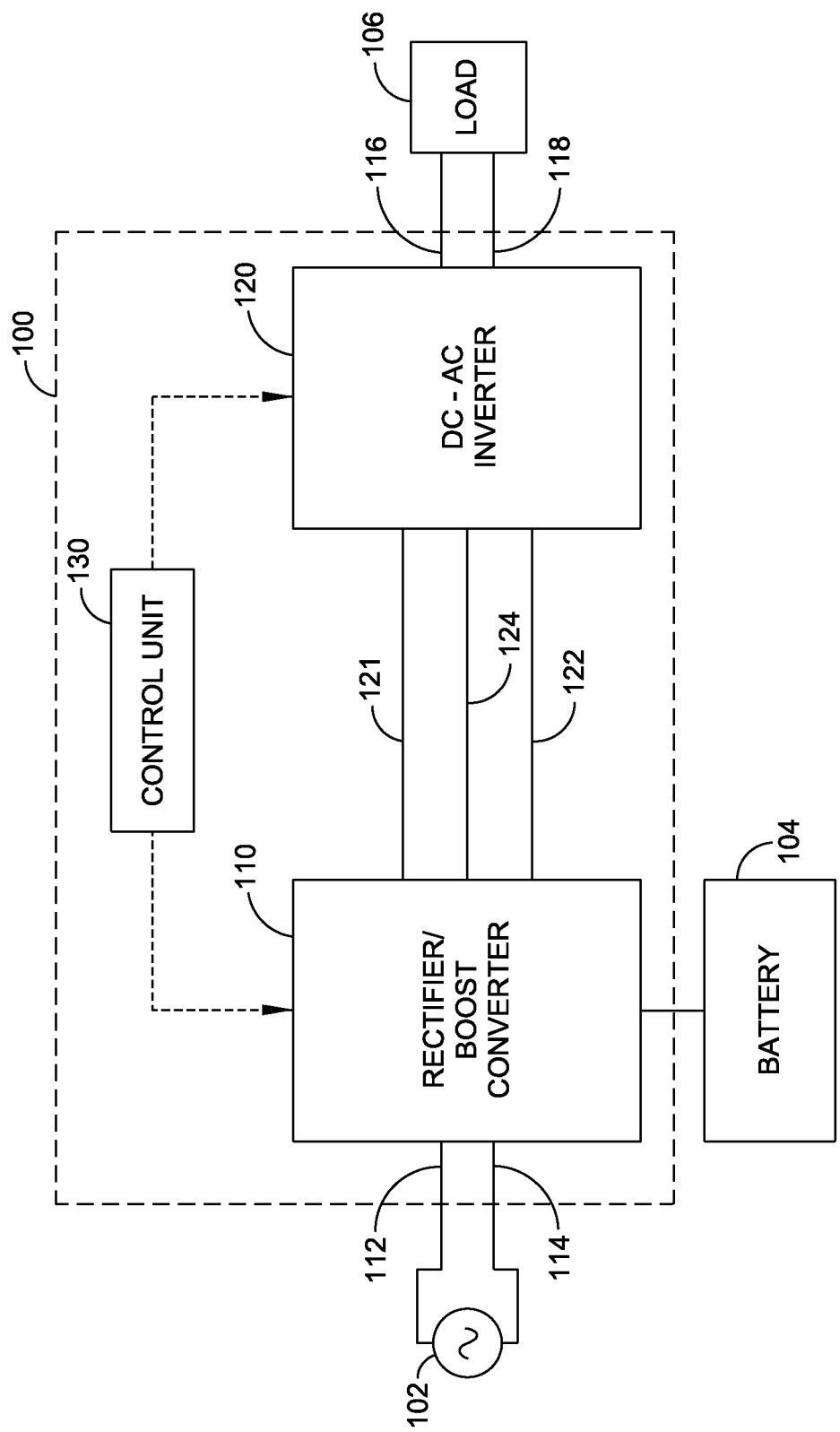
FIG. 1 is a functional block diagram of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of a UPS 100 according to one embodiment of the present invention. The UPS 100 provides regulated power to a load 106 from either an AC power source 102 or a backup power source, such as a battery 104. The UPS 100 includes a rectifier/boost converter 110, an inverter 120, and a control unit 130 for controlling the rectifier/boost converter and the inverter. The UPS has a line (or phase) input 112 and a neutral input 114 of the AC power source 102, and a line output 116 and a neutral output 118 each coupled to the load 106.

In line mode of operation, under control of the control unit 130, the rectifier/boost converter 110 converts the input AC voltage into positive and negative DC voltages at a positive DC bus 121 and a negative DC bus 122, respectively. The positive DC bus 121 and the negative DC bus 122 may, for example, each be rated up to +/−400 VDC. The rectifier/boost converter 110 includes a common or neutral line 124. The neutral line 124 may be coupled to the input neutral 114 and the output neutral 118 to provide a continuous neutral path through the UPS 100. In backup mode of operation (also called battery mode of operation), upon loss of input AC power the rectifier/boost converter 110 generates the positive and negative DC voltages from the battery 104. In both line and backup modes of operation, the inverter 120 receives the positive DC voltage 121 and the negative DC voltage 122 from the rectifier/boost converter 110. The inverter 120 converts the positive and negative DC voltages into an output AC voltage at lines 116 and 118.

Figure 2A:
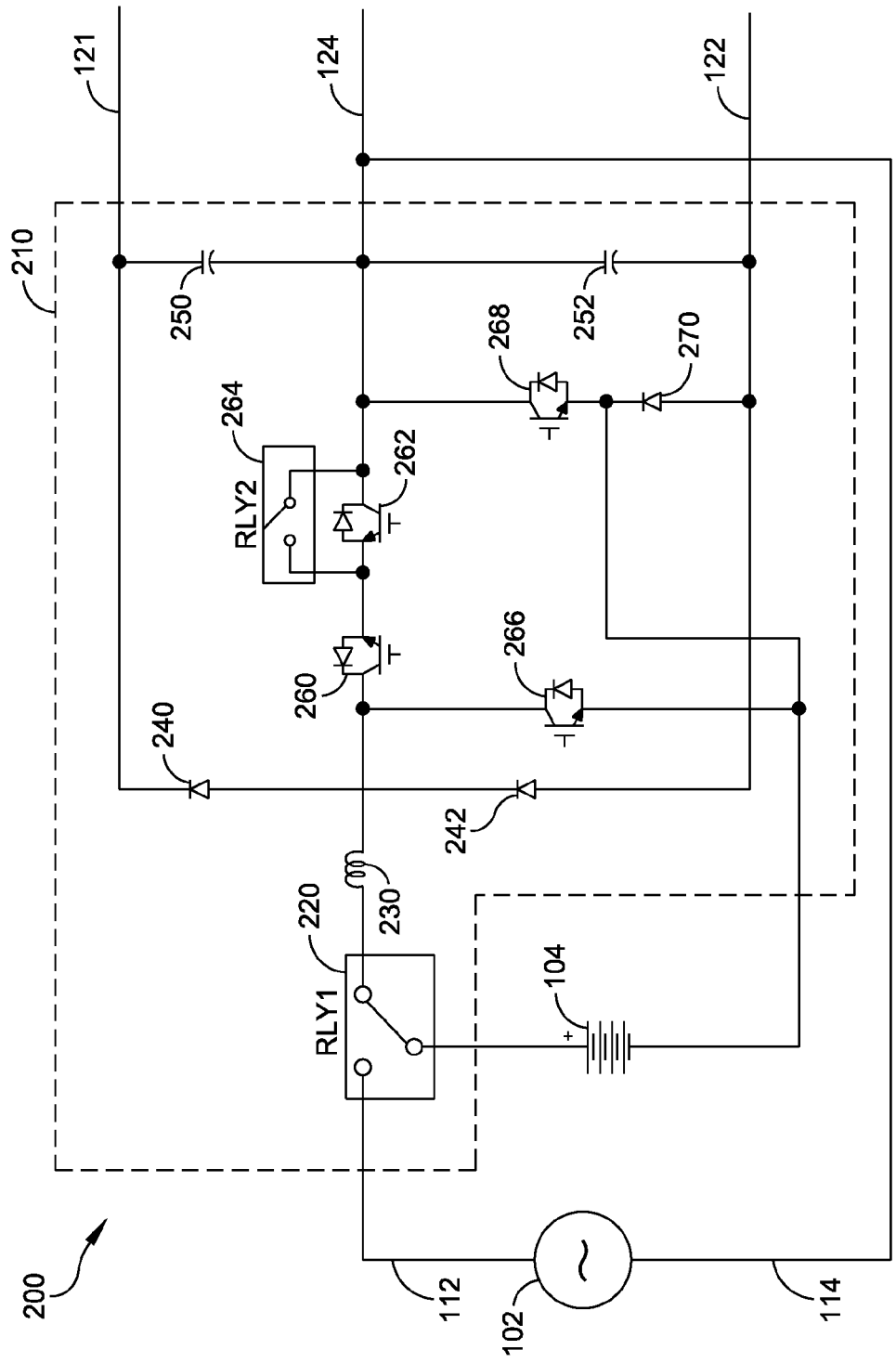
FIG. 2A is a schematic diagram of a power conversion circuit in accordance with one embodiment of the present invention.

FIG. 2A is a schematic diagram of a power conversion circuit 200 according to one embodiment of the present invention. The circuit 200 may be used, for example, within the UPS 100 described above with respect to FIG. 1. The topology of the circuit 200 includes a single inductor dual output boost converter (i.e., positive and negative DC voltages). Within the circuit 200 is a power factor correction (PFC) rectifier circuit 210 coupled to the line input 112 and the neutral input 114 of the AC mains power source 102, and to the positive and negative terminals of the battery 104.

During operation, the PFC rectifier circuit 210 receives either AC power from the AC power source 102 or input DC power from the battery 104. The PFC rectifier circuit 210 is configured to convert, in a line mode of operation, the AC power into an output DC power, which is supplied to a split DC bus having a positive DC bus 121 and a negative DC bus 122. The PFC rectifier circuit 210 is further configured to convert, in a backup mode of operation, the input DC power from the battery 104 into output DC power at the positive DC bus 121 and the negative DC bus 122. The positive DC bus 121, the negative DC bus 122, and/or the neutral line 124 may be coupled to an inverter (not shown), which is configured to convert the output DC power into output AC power for consumption by a load (also not shown).

The PFC rectifier circuit 210 includes a first relay 220 for switching input power between the AC power source 102 and the battery 104. For example, when the AC power source 102 is available, the first relay 220 may be switched to supply the circuit 210 with power from the AC power source; when the AC power source is not available (or when backup power is desired), the first relay 220 may be switched to supply the circuit 210 with power from the battery 104. The circuit further includes an inductor 230, which, as described below, is used to convert the input power into the positive DC voltage and the negative DC voltage. Unlike some conventional split DC bus circuits, which require multiple inductors, the circuit 200 includes only one inductor and therefore has a higher inductor component utilization rate than conventional circuits having multiple inductors.

Continuing to refer to FIG. 2A, a first diode 240 and a second diode 242 are respectively coupled to a first capacitive element 250 and a second capacitive element 252. The first diode 240 and the second diode 242 rectify an AC input current into a DC current at the first capacitive element 250 and the second capacitive element 252, respectively, during the respective positive and negative half line cycles of the AC power source 102. The first capacitive element 250, for storing a positive DC voltage, is coupled at one end to the positive DC bus 121 and at the other end to the neutral line 124. The second capacitive element 252, for storing a negative DC voltage, is coupled at one end to the negative DC bus 122 and at the other end to the neutral line 124. The circuit 200 further includes a first switch 260, a second switch 262, a second relay 264, a third switch 266, a fourth switch 268, and a third diode 270, as shown in FIG. 2A.

Figure 2B:
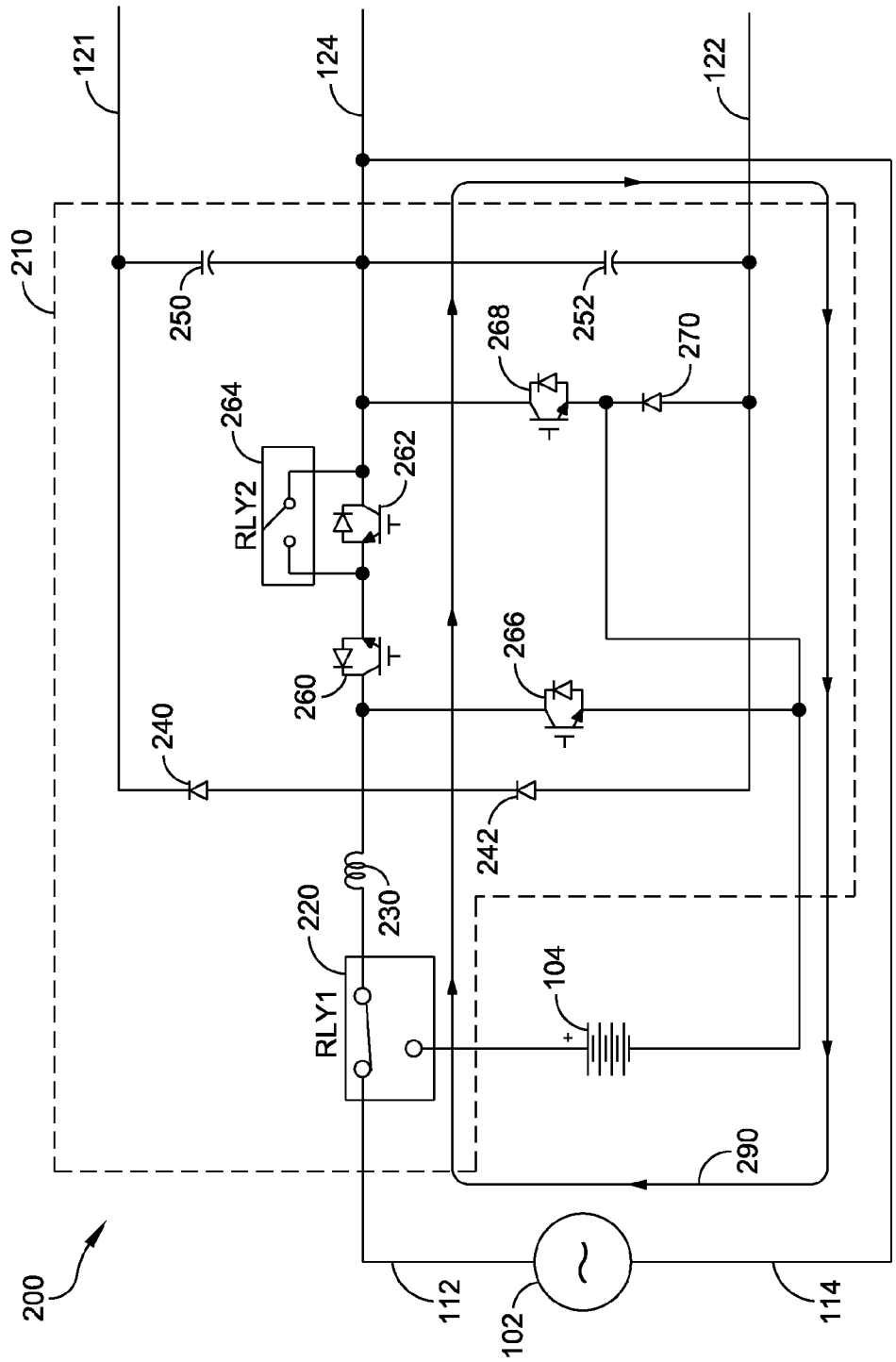
FIGS. 2B-2G are schematic diagrams showing various circuit paths of the power conversion circuit of FIG. 2A.
Figure 2C:
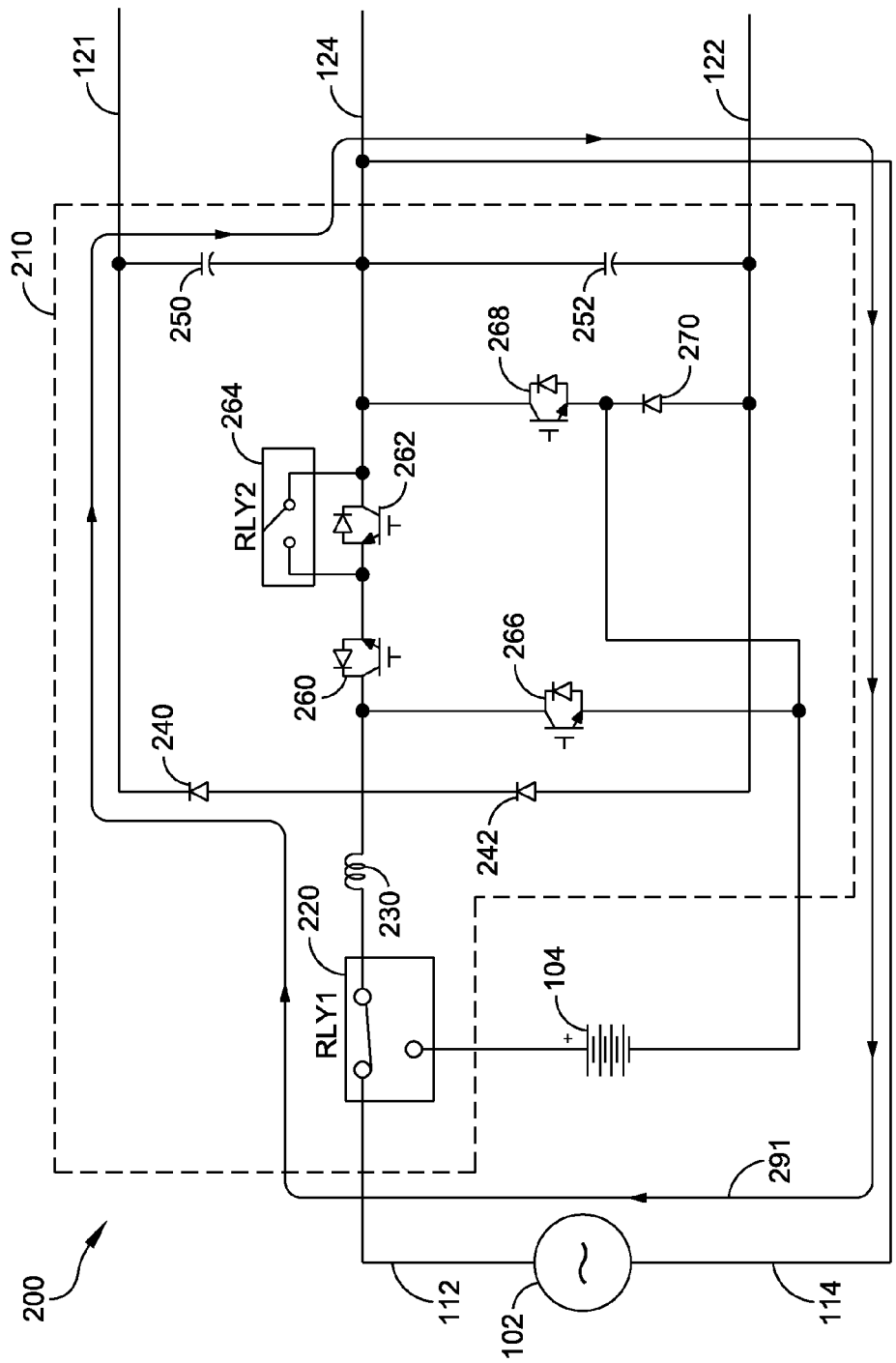
Figure 2D:
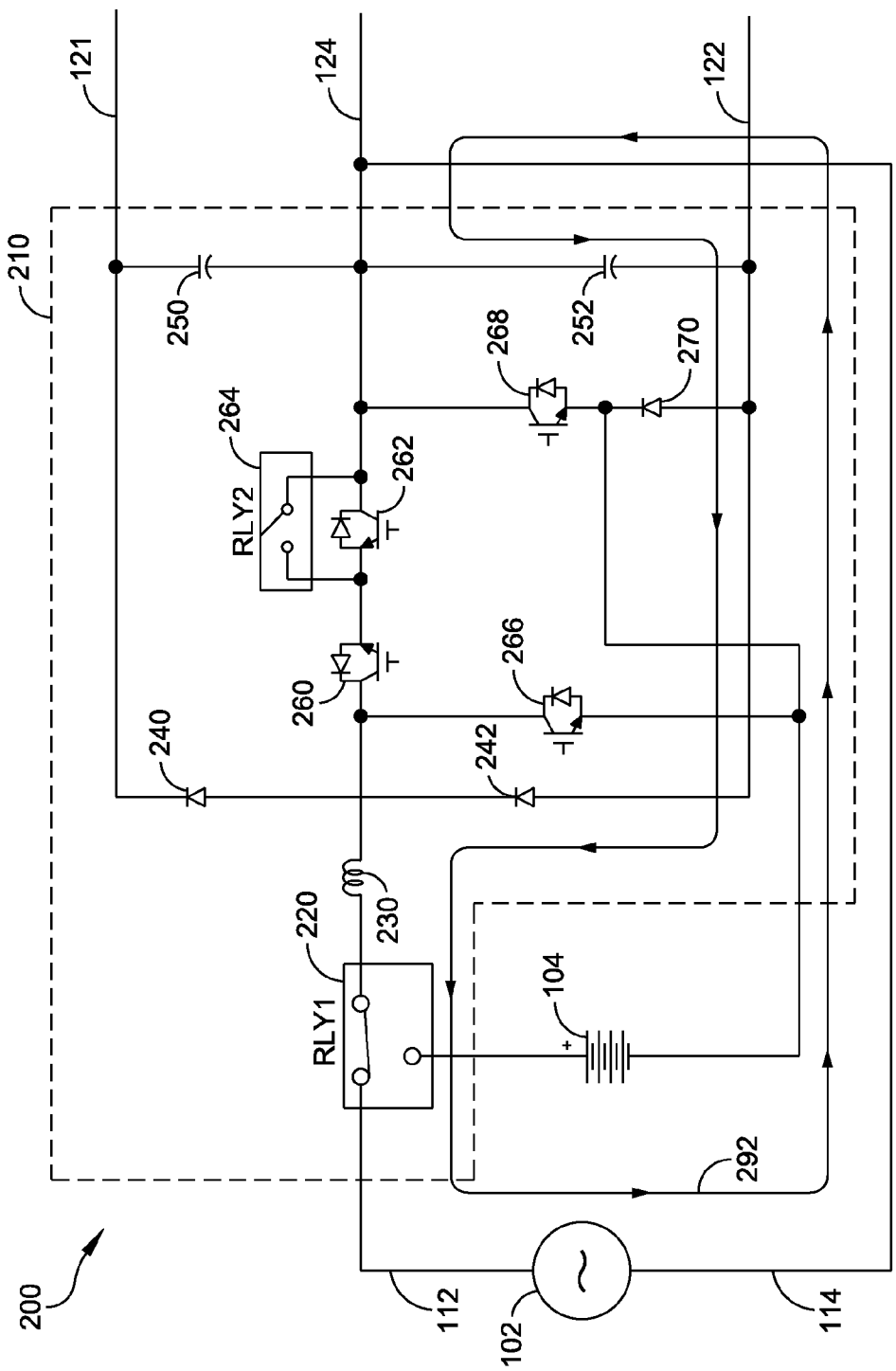

In one embodiment, and as illustrated in FIGS. 2B, 2C and 2D, during the line mode of operation, the power conversion circuit 200 alternately charges the inductor 230 (on-state of the boost converter) using the input AC power and discharges the inductor 230 (off-state of the boost converter) to either the first capacitive element 250 or the second capacitive element 252, depending on the polarity of the input AC power (i.e., positive or negative half cycles). FIG. 2B illustrates a first current path 290 within the power conversion circuit 200 of FIG. 2A with which the inductor 230 is charged using the input AC power during the positive half line cycle of the input AC power. During the negative half line cycle, the first current path 290 is reversed. The first relay 220 is switched to the AC mains line input 112, and switches 260 and 262 are turned on to charge the inductor 230 in the on-state of the boost converter. Relay 264 is open during the line mode of operation. There are two semiconductor drops while charging the inductor 230 across switches 260 and 262.

Switches 260 and 262 are turned off to discharge the energy stored in the inductor 230 to the split DC bus in the off-state of the boost converter. FIG. 2C illustrates a second current path 291 within the power conversion circuit 200 of FIG. 2A with which the energy stored in the inductor 230 is discharged during the positive half line cycle of the AC mains power input. During the positive half line cycle of the AC mains power input, the energy from the inductor 230 charges the first capacitive element 250 through the diode 240. FIG. 2D illustrates a third current path 292 during which the energy stored in the inductor 230 is discharged during the negative half line cycle of the AC mains power input. During the negative half line cycle, the energy from the inductor 230 charges the second capacitive element 252 through the diode 242. There is one diode drop across diode 240 while discharging the inductor 230 during the positive half line cycle, and one diode drop across diode 242 while discharging the inductor 230 during the negative half line cycle.

Figure 2E:
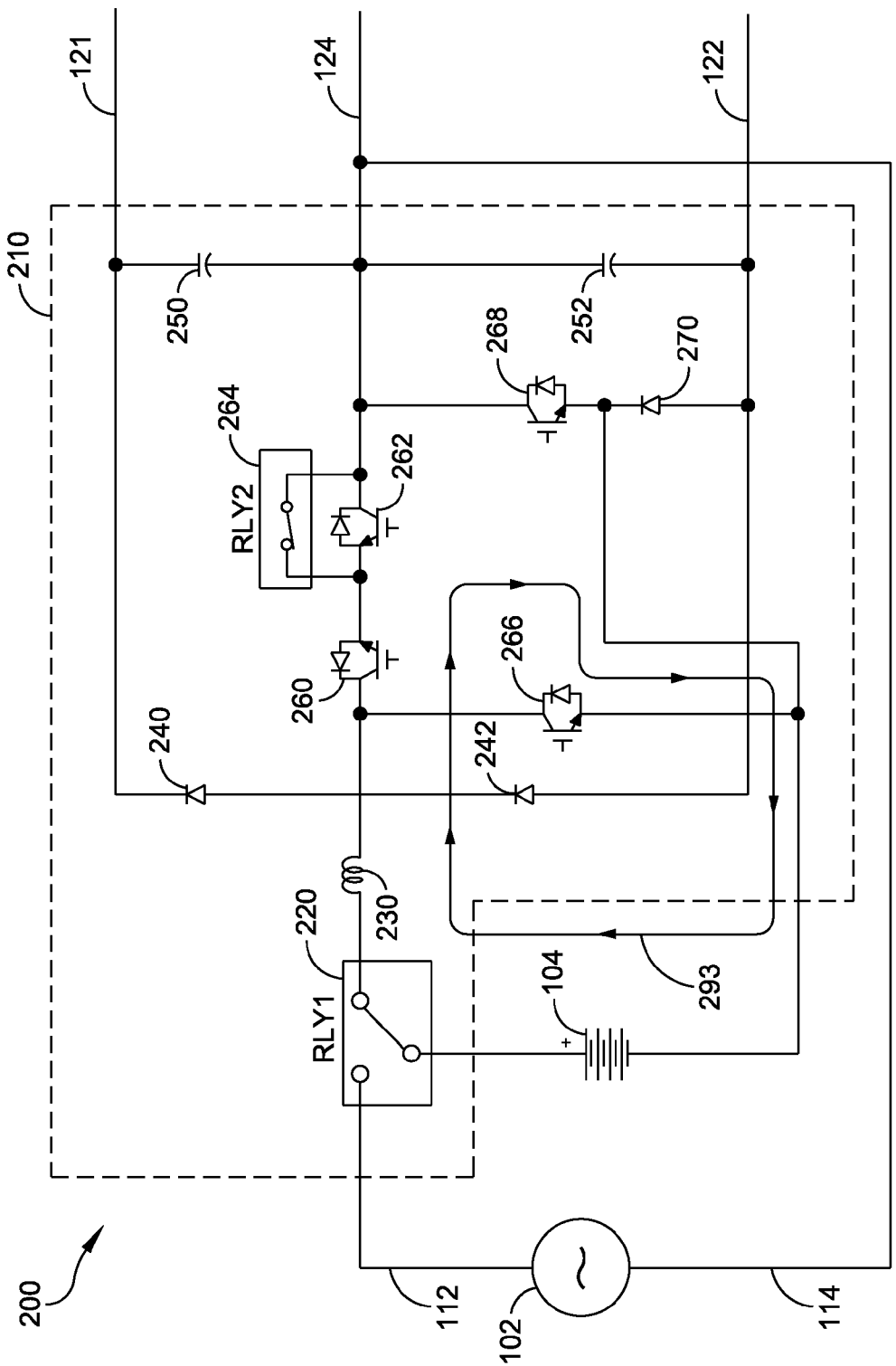
Figure 2F:
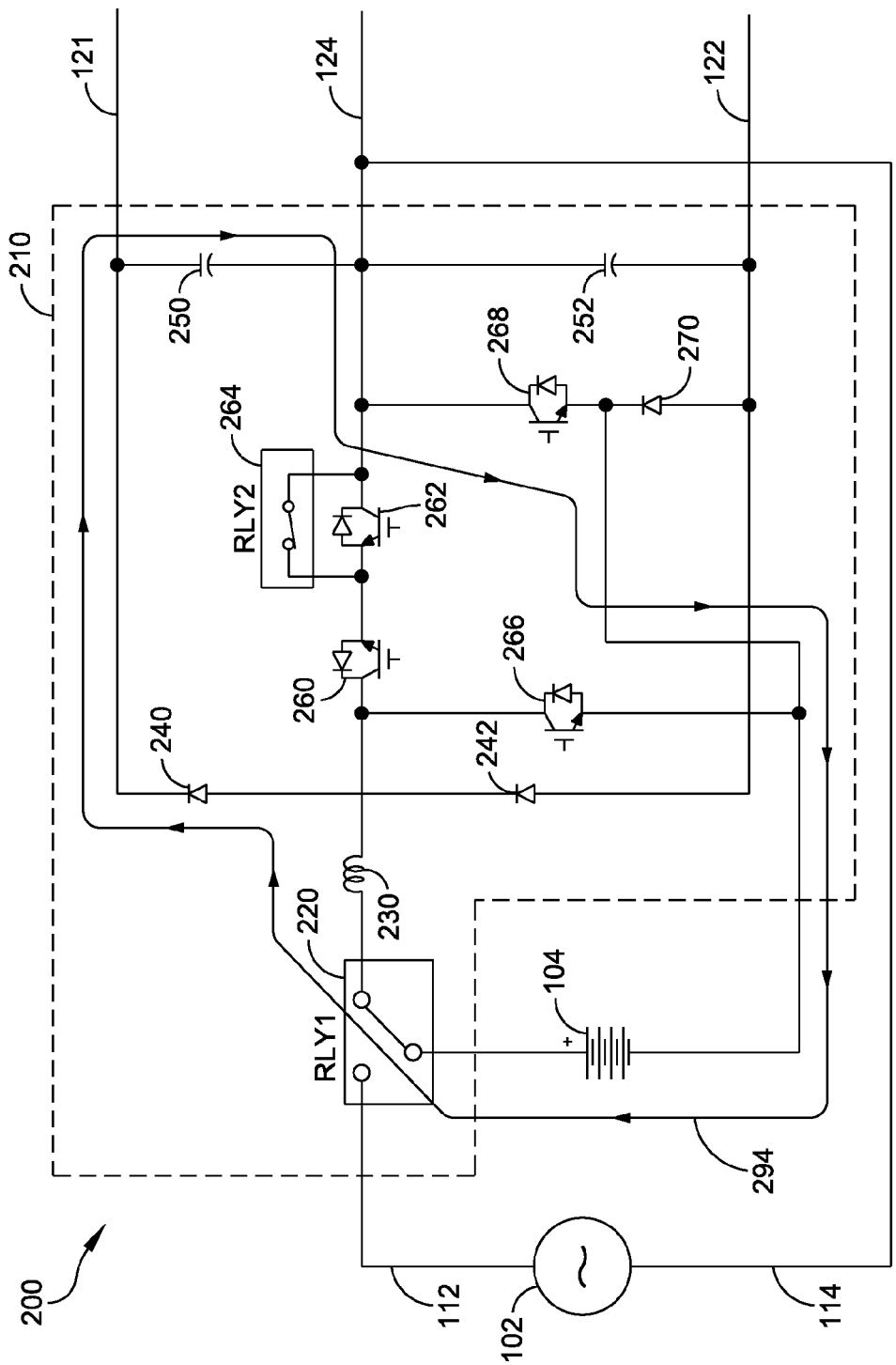
Figure 2G:
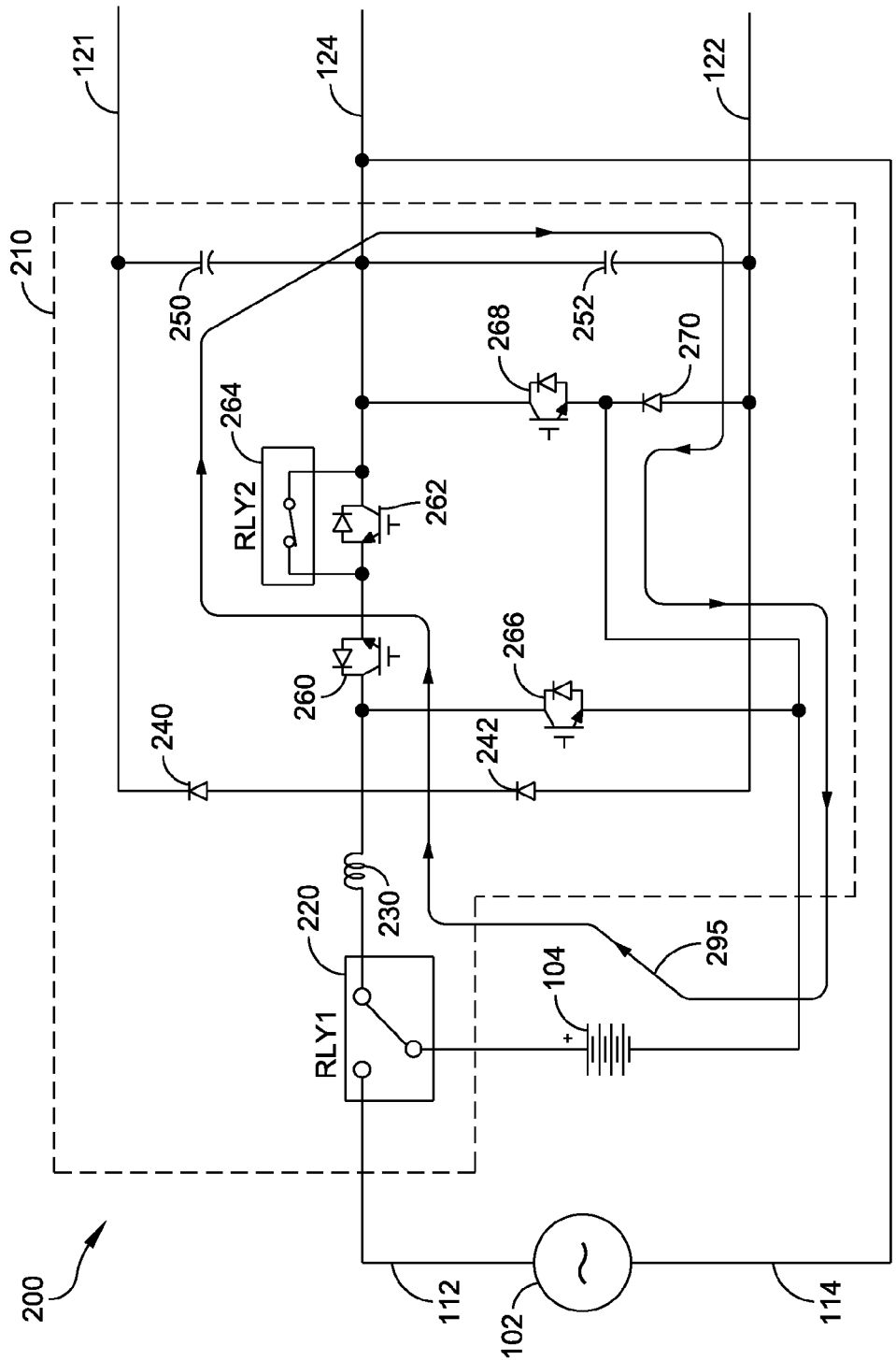

As illustrated in FIGS. 2E, 2F and 2G, during the backup mode of operation the power conversion circuit 200 is configured as a DC-DC converter boost converter. The power conversion circuit 200 alternately charges the inductor 230 (on-state of the boost converter) using the input DC power (e.g., from the battery 104) and discharges the inductor 230 (off-state of the boost converter) to either the first capacitive element 250 or the second capacitive element 252. FIG. 2E illustrates a fourth current path 293 within the power conversion circuit 200 of FIG. 2A with which the inductor 230 is charged using the input DC power from, for example, the battery 104. To reduce losses, the relay 264 is closed to bypass the switch 262, which is not used during the backup mode of operation. The switch 266 is turned on to charge the inductor 230 from the battery 104 in the on-state of the boost converter.

Switch 266 is turned off to discharge the energy stored in the inductor 230 to the split DC bus in the off-state of the boost converter. FIG. 2F illustrates a fifth current path 294 within the power conversion circuit 200 of FIG. 2A with which the energy stored in the inductor 230 is transferred to the first capacitive element 250 through the diode 240. Energy from the inductor 230 charges the first capacitive element 250 at the positive DC bus 121 through switch 268, and switch 260 is turned off. FIG. 2G illustrates a sixth current path 295 with which the energy stored in the inductor 230 is transferred to the second capacitive element 252 through the diode 270. Energy from the inductor 230 charges the second capacitive element 252 at the negative DC bus 122 through switch 260, and switch 268 is turned off. There is one semiconductor drop across switch 266 while charging the inductor. While discharging the inductor through the first capacitive element 250, there are two semiconductor drops across diode 240 and switch 268; while discharging the inductor through the second capacitive element 252, there are two semiconductor drops across switch 260 and diode 270.

Figure 3:
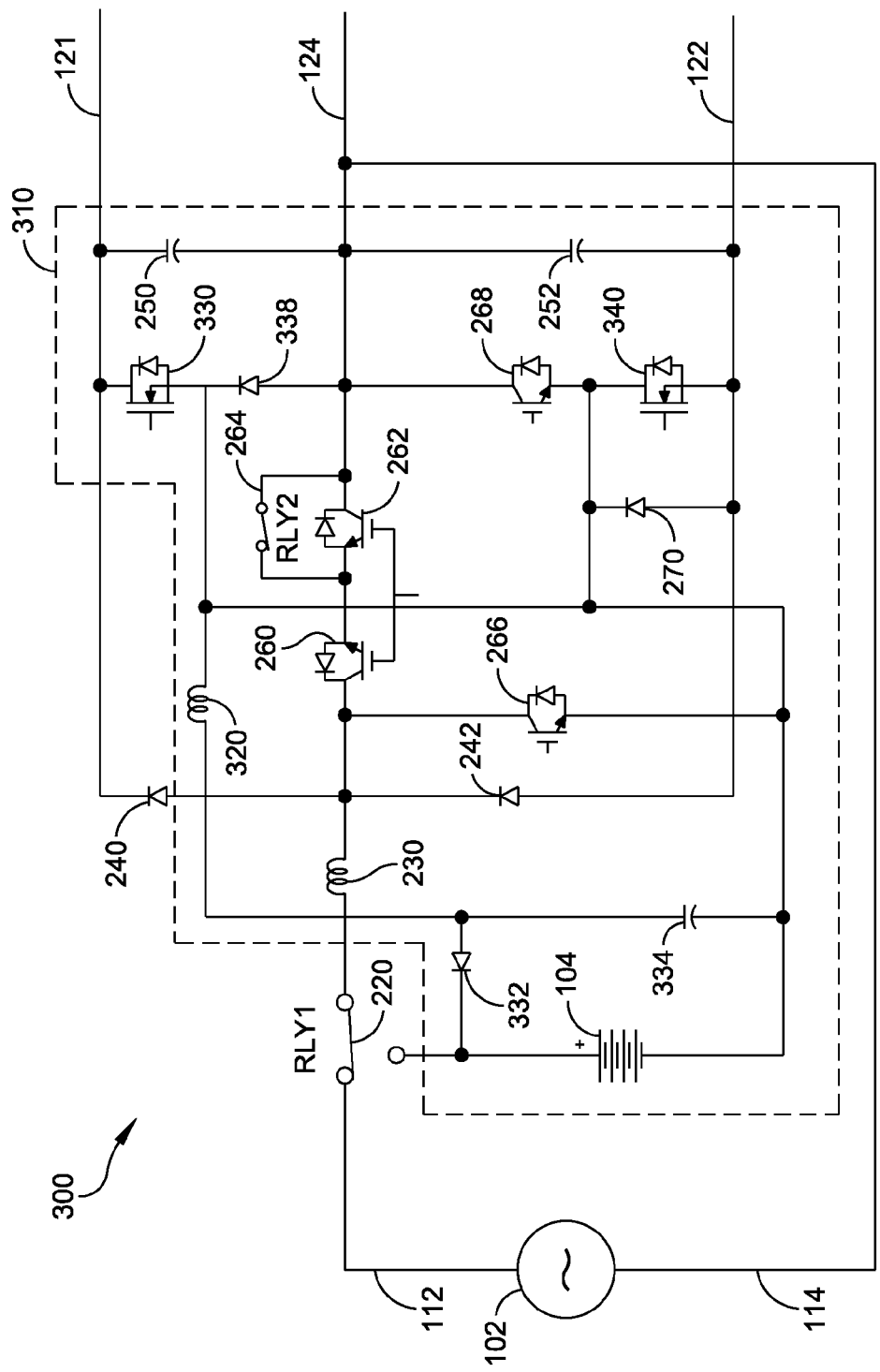
FIG. 3 is a schematic diagram of a power conversion circuit having an integrated battery charger in accordance with one embodiment of the present invention.

FIG. 3 is a schematic of a power conversion circuit 300 according to another embodiment of the present invention. The circuit 300 may be used, for example, within the UPS 100 described above with respect to FIG. 1. The circuit 300 is substantially similar to the power conversion circuit 200 described above with respect to FIGS. 2A-2G, except that the circuit 300 includes an integrated battery charging circuit, generally indicated at 310. The battery charging circuit 310 is configured as a buck converter and includes a second inductor 320. The battery charging circuit 310 receives power from the split DC bus (e.g., the first capacitive element 250 at the positive DC bus 121 and second capacitive element 252 at the negative DC bus 122). A switch 330 is operated with a pulse-width modulated (PWM) control signal to charge the second inductor 320 using energy stored in the first capacitive element 250 with a charger current through the second inductor 320, a fourth diode 332, the battery 104, a third capacitive element 334 (which may act as a filter), and the body diode of the switch 268. When the switch 330 is turned off, the charger current freewheels through an optional diode 336 or through the body diode of the switch 268 and a diode 338. The optional diode 336 bypasses the diode 338 and the body diode of the switch 268 to reduce the conduction losses in the circuit 300.

A switch 340 is operated with a PWM control signal to charge the second inductor 320 using energy stored in the second capacitive element 252 at the negative DC bus 122 with a charging current through the diode 338, the second inductor 320, the diode 332, the battery 104, the third capacitive element 334 (which may act as a filter), and the switch 340. When the switch 340 is turned off, the charging current freewheels through the optional diode 336 or through the body diode of the switch 268 and the diode 338.

Figure 4:
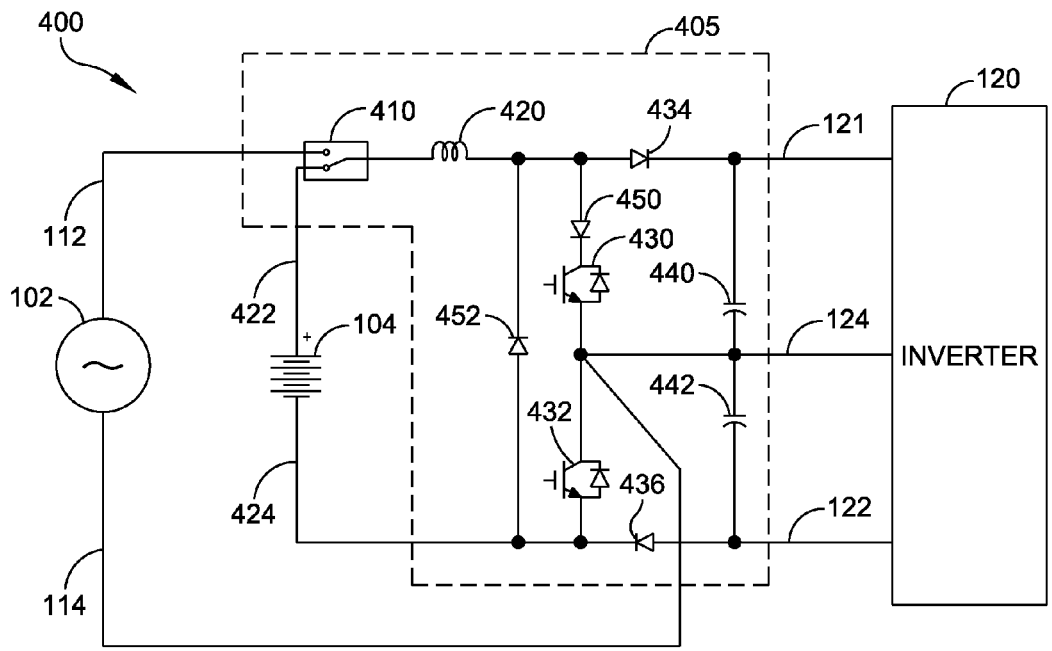
FIG. 4 is a schematic diagram of a conventional power conversion circuit.

FIG. 4 shows a conventional circuit 400 for converting AC power into DC power at the positive DC bus 121 and the negative DC bus 122. The AC mains power source 102 includes the line input 112 and the neutral input 114, and the battery 104 includes a positive DC input 422 and a negative DC input 424. Within the circuit 400 is a power factor correction (PFC) rectifier circuit 405 coupled to the line input 112 and the neutral input 114 of the AC mains power source 102, and to the positive and negative terminals of the battery 104. The circuit 405 includes a neutral bus 124 that is coupled to the neutral input 114 of the AC mains power source 102. One end of a first capacitive element 440 is coupled to the positive DC bus 121 and the other end is coupled to the neutral line 124. One end of a second capacitive element 442 is coupled to the negative DC bus 122 and the other end is coupled to the neutral line 124.

The circuit 405 is switchably coupled to the AC mains power source 102 and the DC backup power source, such as the battery 104, through a relay 410. For example, when the AC mains power source 102 is available, the relay 410 is switched to a normally open position to connect the line input 112 of the AC mains power source 102 to the circuit 400. When the AC mains power source 102 is unavailable, the relay 410 is switched to a normally closed position to connect the positive DC input 422 of the battery 104 to the circuit 400. The positive DC bus 121 and the negative DC bus 122 may act as an interface for transferring power between electrical components, for example, between the AC mains power source 102 and/or the battery 104 and the inverter 120. The inverter 120 may be used to convert DC power at the positive DC bus 121 and the negative DC bus 122 into AC power that is supplied to a load (not shown).

The circuit 405 further includes an inductor 420 coupled to the relay 410. The inductor 420 forms a portion of a boost circuit configured to generate a positive DC voltage at the positive DC bus 121 and a negative DC voltage at the negative DC bus 122. The positive side of the boost circuit includes a first switch 430 coupled to the inductor 420 and a first diode 434, and the first diode 434 is coupled to the first capacitive element 440. The downstream side of the first switch 430 is coupled to the neutral bus 124. The negative side of the boost circuit includes a second switch 432 coupled to the inductor 420 and a second diode 436, and the second diode 436 is coupled to the second capacitive element 442. The circuit 400 further includes a third diode 450 coupled between the inductor 420 and the first switch 430, and a fourth diode 452 coupled between the inductor 420 and the second switch 432.

In a line mode of operation, power is provided to the circuit 405 from the AC mains power source 102. During a positive half line cycle of the AC mains input, the first switch 430 is operated on a pulse width modulated (PWM) switching cycle to alternately charge the inductor 420 from the line input 112 and discharge the inductor 420 to the first capacitive element 440 through the first diode 434. The fourth diode 452 blocks current from reaching the negative side of the boost converter during the positive half line cycle. The first diode 434 is the only diode in the current path from the inductor 420 to the first capacitive element 440 (i.e., while the first capacitive element is being charged).

During a negative half line cycle of the AC mains input, and in the line mode of operation, the second switch 432 is operated on a PWM switching cycle to alternately charge the inductor 420 from the neutral input 114 and discharge the inductor 420 to the second capacitive element 442 through the second diode 436. The third diode 450 blocks current from reaching the positive side of the boost converter during the negative half line cycle. Unlike during the positive half line cycle, where there is only one diode (i.e., the first diode 434) in the current path between the inductor 420 and the DC bus, during the negative half line cycle the second diode 436 and the fourth diode 452 are in the current path from the second capacitive element 442 to the inductor 420 (i.e., while the second capacitive element is being charged). Thus, the diode losses incurred during the negative half line cycle are greater than the diode losses incurred during the positive half line cycle.

In a backup mode of operation, power is provided to the circuit 405 from the battery 104. The inductor 420 is charged by turning switches 430 and 432 on. During charging of the inductor 420, there are three semiconductor drops in series: diode 450, switch 430 and switch 432, which reduces the efficiency of the circuit 405 during the backup mode of operation. The inductor 420 is discharged through the first capacitive element 440 by turning switch 430 off and turning switch 432 on. The inductor 420 is discharged through the second capacitive element 442 by turning switch 430 on and turning switch 432 off.

Figure 5A:
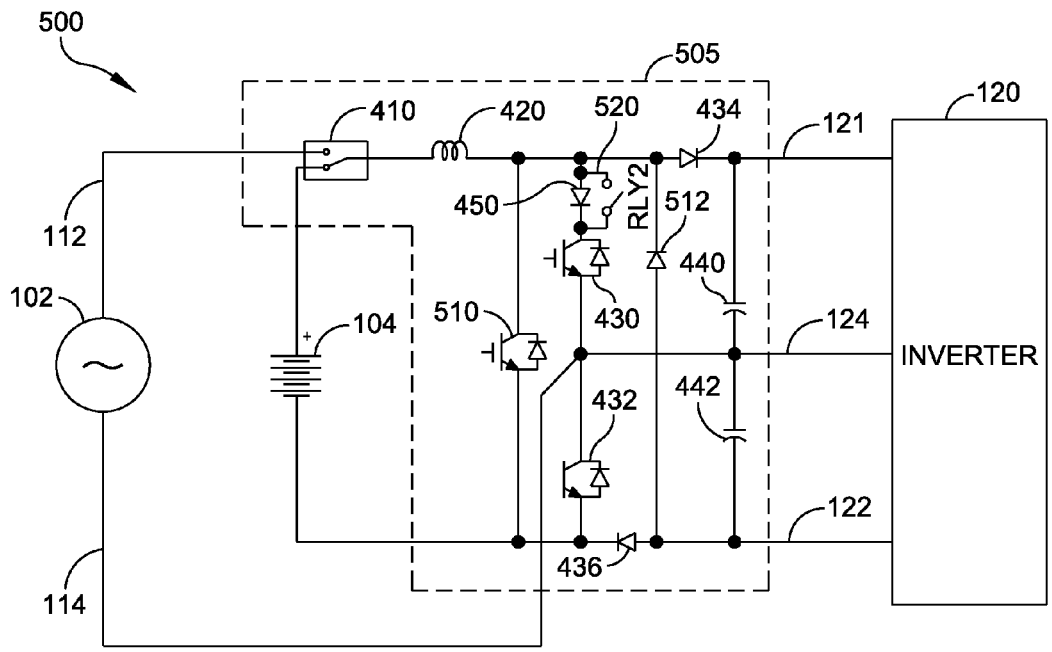
FIG. 5A is a schematic diagram of a power conversion circuit in accordance with another embodiment of the present invention.

FIG. 5A shows a circuit 500 for converting AC power into DC power at the positive DC bus 121 and the negative DC bus 122 according to one embodiment. The circuit 500 includes, in addition to some of the elements of the circuit 400 of FIG. 4, a PFC circuit 505, a third switch 510 having a body diode, a diode 512, and a second relay 520 is coupled in parallel to the diode 450.

Figure 5B:
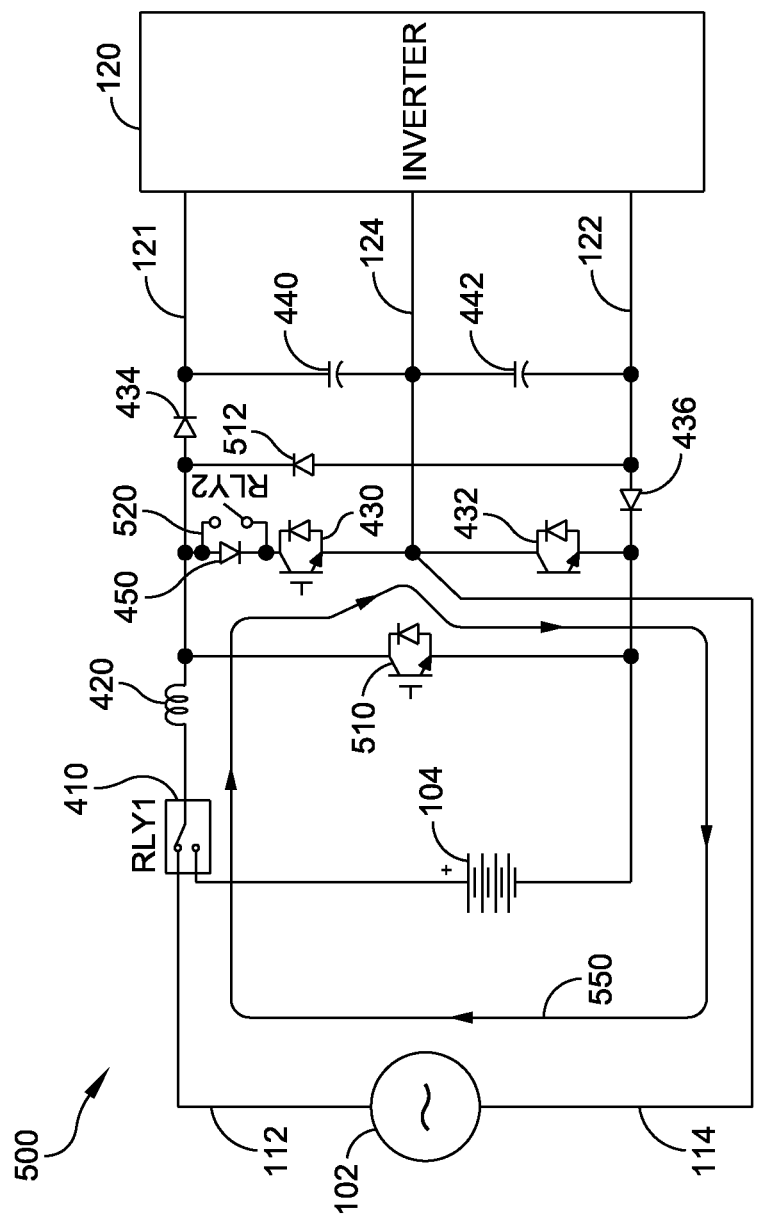
FIGS. 5B-5H are schematic diagrams showing various circuit paths of the power conversion circuit of FIG. 5A.
Figure 5C:
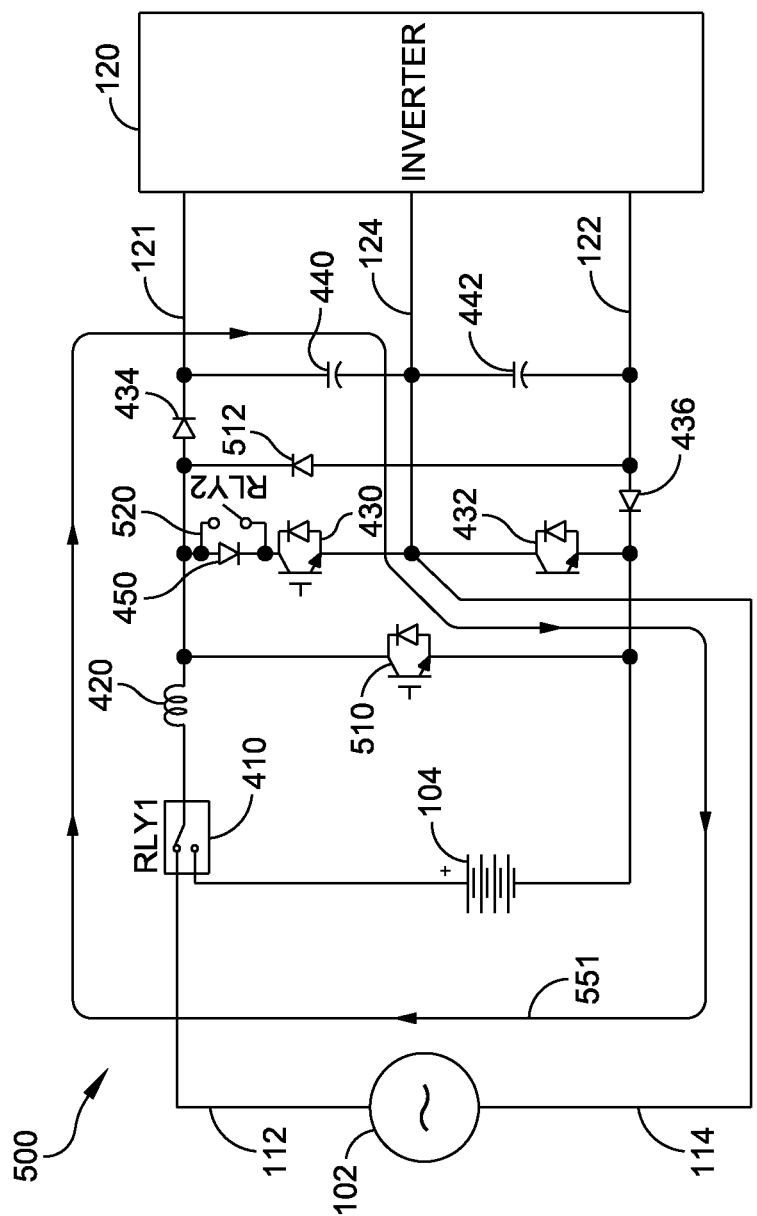

In the line mode of operation, the second relay 520 is open. During the positive half line cycle of the AC mains input 102, the first switch 430 is turned on to charge the inductor 420 through diode 450, as shown by a current path 550 in FIG. 5B. When the first switch 430 is turned off, the energy stored in the inductor 420 discharges through the first capacitive element 440 on the positive DC bus 121 through diode 434, as shown by a current path 551 in FIG. 5C.

Figure 5D:
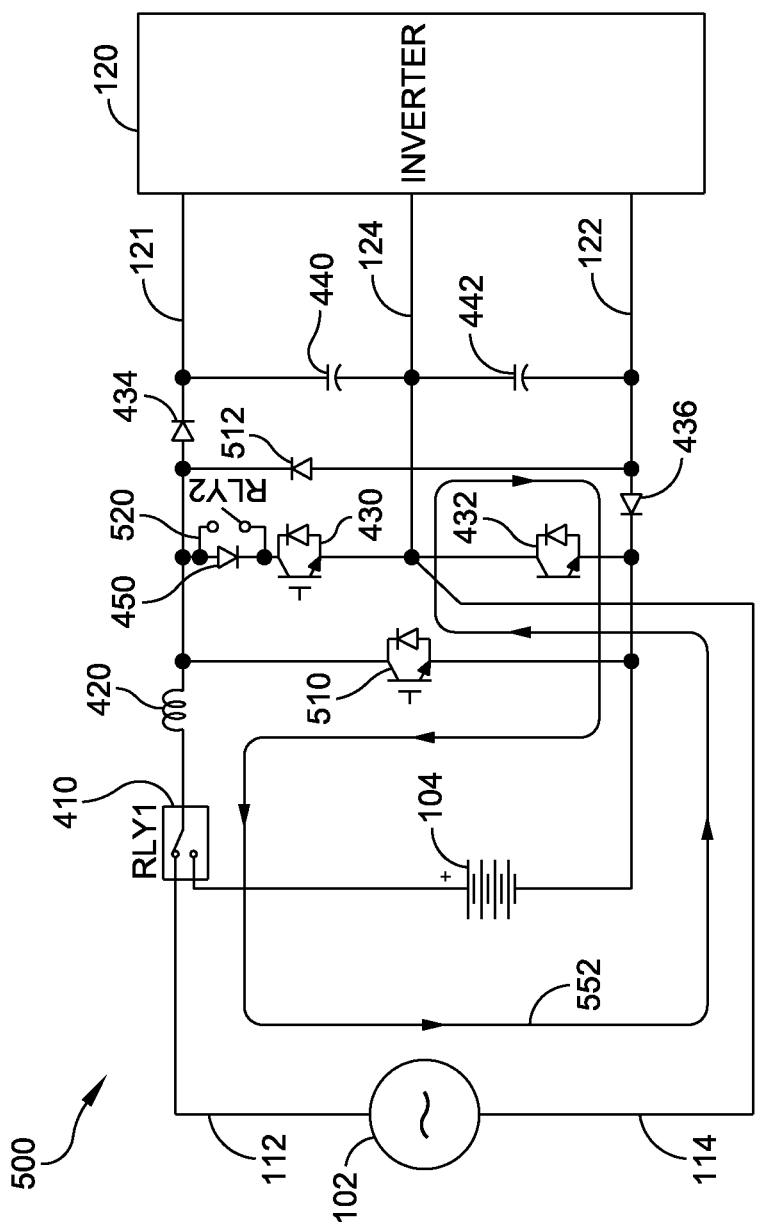
Figure 5E:
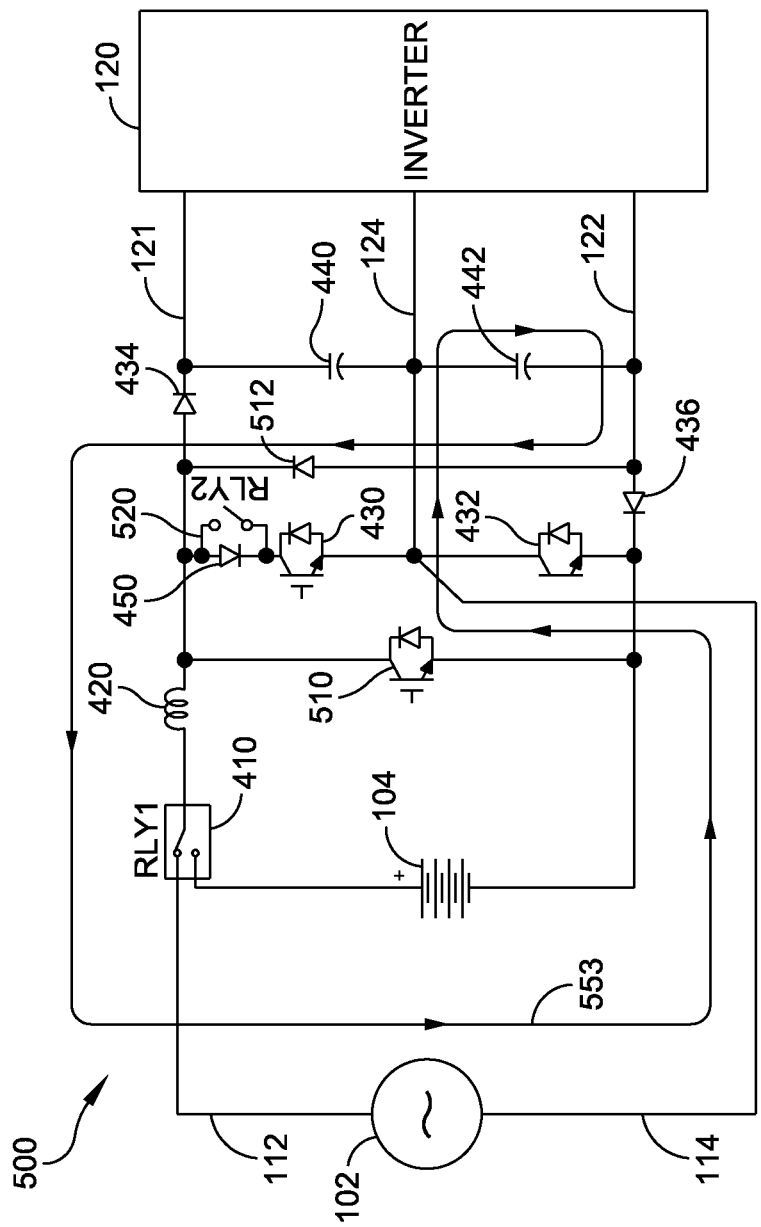

During the negative half line cycle of the AC mains input 102, and during the line mode of operation, the second switch 432 is turned on to charge the inductor 420 through the body diode of the third switch 510, as shown by a current path 552 in FIG. 5D. When the second switch 432 is turned off, the energy stored in inductor L1 discharges through the second capacitive element 442 on the negative DC bus 122 through the diode 512, as shown by a current path 553 in FIG. 5E.

Figure 5F:
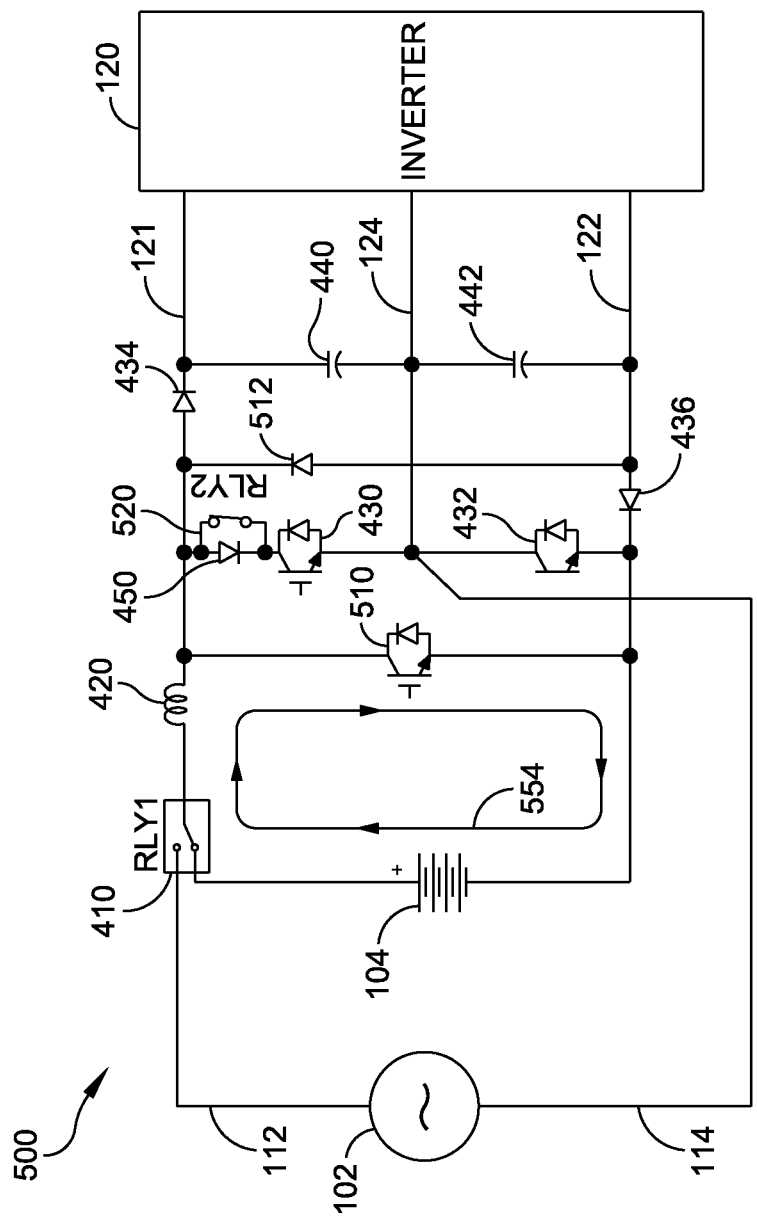
Figure 5G:
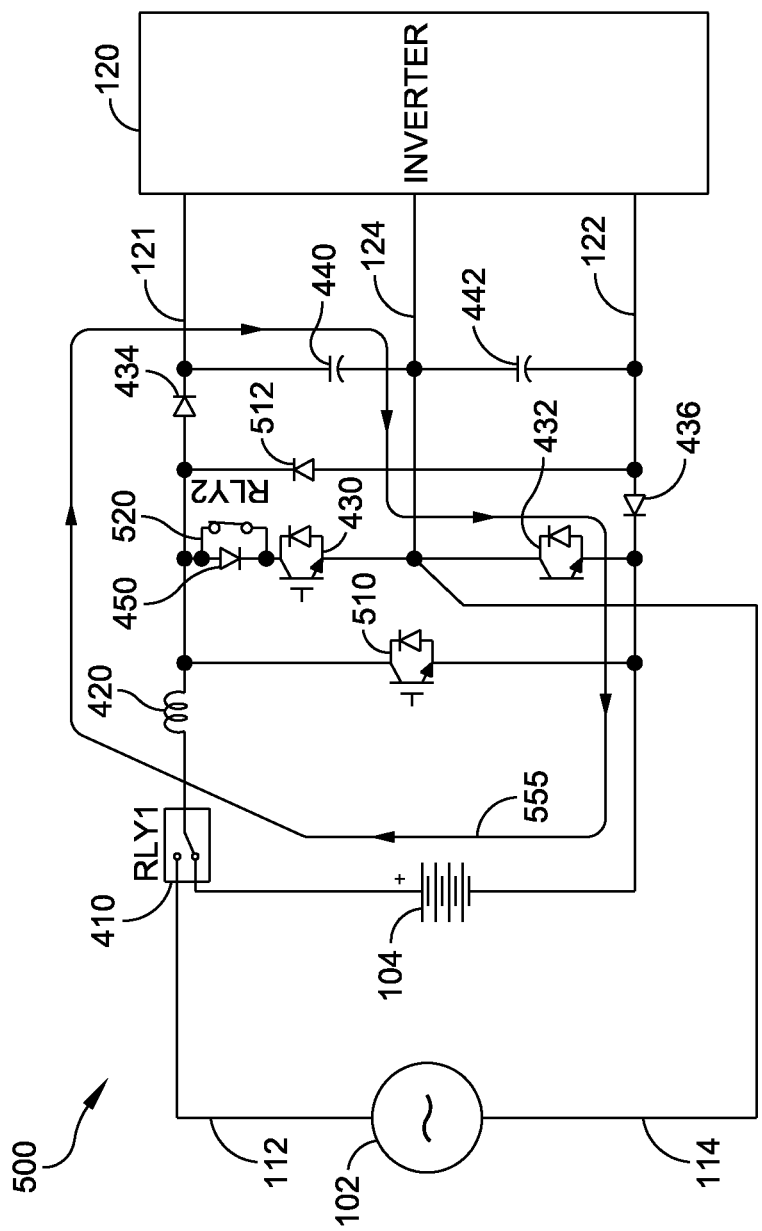
Figure 5H:
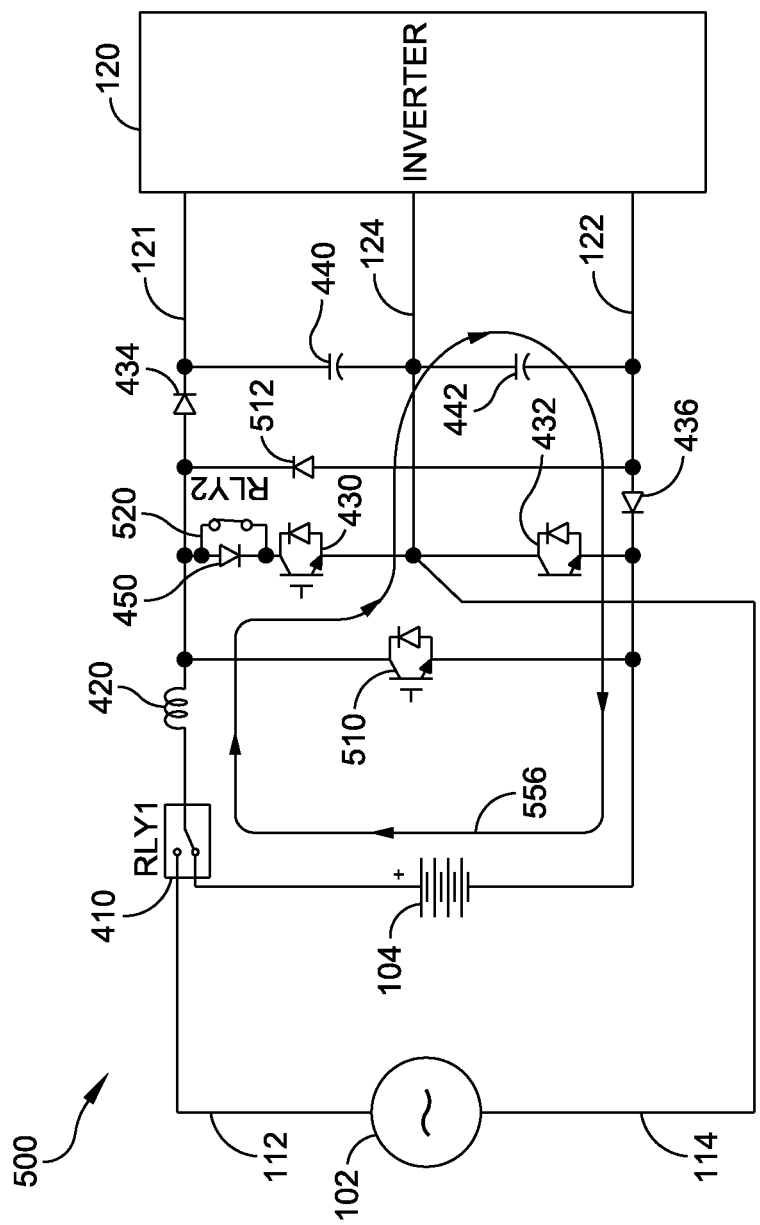

In the backup mode of operation, the second relay 520 is closed. The third switch 510 is turned on to charge the inductor 420 from the battery 104, as shown in a current path 554 in FIG. 5F. The third switch 452 is turned off to discharge the inductor 420. As shown in a current path 555 in FIG. 5G, energy stored in the inductor 420 discharges through the first capacitive element 440 on the positive DC bus 121, the diode 434 and the second switch 432, which is turned on. As shown in a current path 556 in FIG. 5H, energy stored in the inductor 420 discharges through the second capacitive element 442 on the negative DC bus 122 through the second relay 520, which is closed to bypass the diode 450, the first switch 430, which is turned on, and the diode 436. Bypassing the diode 450 with the second relay 520 reduces conduction losses of the circuit 505. Further, the diode 512 is in parallel to the diode 436 and the body diode of the third switch 510, which further reduces conduction losses of the circuit 505.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multiphase uninterruptible power supplies.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A power converter, comprising:
a first power input to receive AC input power;
a second power input to receive backup power;
a first DC, bus configured to provide a positive DC, output voltage;
a second DC bus configured to provide a negative DC output voltage; and
a power conversion circuit, coupled to the first DC bus and the second DC bus, having an inductor, a first switch device coupled in series with the inductor, a second switch device coupled in series with the first switch device, and a bypass relay coupled in parallel with the second switch device, the power conversion circuit switchably coupled to the first power input and the second power input, the power conversion circuit operable to charge the inductor and generate the positive and negative DC output voltages, the power conversion circuit configured to:
in a line mode of operation and during a positive portion of the AC input power, charge the inductor through a first current path of the power conversion circuit that includes the first switch device, the second switch device, the first power input and the inductor;
in the line mode of operation and during a negative portion of the AC input power, charge the inductor through a second current path of the power conversion circuit that includes the first switch device, the second switch device, the first power input and the inductor; and
in a backup mode of operation. generate the negative DC output voltage through a third current path of the power conversion circuit that includes the second power input, the inductor, the first switch device and the bypass relay, wherein the third current path bypasses the second switch device through the bypass relay.

2. The power converter of claim 1, wherein the power conversion circuit includes a boost converter circuit operable to transfer power stored in the inductor to the first DC bus and the second DC bus.

3. The power converter of claim 2, further comprising a neutral input and a third switch device coupled to the inductor, wherein the power conversion circuit is further configured to, in the backup mode of operation, charge the inductor through a fourth current path of the power conversion circuit that includes the inductor and the third switch device.

4. The power converter of claim 3, further comprising a fourth switch device coupled to the neutral input, wherein the power conversion circuit is further configured to generate the positive DC output voltage through a fifth current path of the power conversion circuit that includes the inductor and the fourth switch.

5. The power converter of claim 4, further comprising a battery coupled to the second power input.

6. The power converter of claim 5, further comprising a battery charging circuit coupled to the battery, the first DC bus and the second DC bus, wherein the battery charging circuit is configured to charge the battery from at least one of the first DC bus and second DC bus.

7. The power converter of claim 6, wherein the inductor is a first inductor, and wherein the battery charging circuit includes a second inductor coupled between the battery and at least one of the first DC bus and the second DC bus.

8. The power converter of claim 4, further comprising a DC-AC inverter circuit coupled to the first DC bus and the second DC bus and configured to convert the positive DC output voltage and the negative DC output voltage into an AC output voltage.

9. A power converter, comprising:
a first power input to receive AC input power;
a second power input to receive backup power;
a power output to provide a positive DC output voltage and a negative DC output voltage each derived from at least one of the AC input power and the backup power;
an inductor switching circuitry coupled to the inductor, the first power input, the second power input and the power output; and a control unit coupled to the switching circuitry and configured to control the switching circuitry to generate the positive DC output voltage and the negative DC output voltage using energy stored in the inductor, wherein the switching circuitry includes a first switch device coupled in series with the inductor, a second switch device coupled in series with the first switch device, and a bypass relay coupled in parallel with the second switch device, wherein the bypass relay is configured to bypass the second switch device in a backup triode of operation.

10. The power converter of claim 9, further comprising a battery coupled to the second power input.

11. The power converter of claim 10, wherein the switching circuitry is coupled to the battery, and wherein the control unit is further configured to control the switching circuitry to charge the battery using at least one of the positive DC output voltage and the negative DC output voltage.

12. A method of providing power to a load, the method comprising:
    detecting a presence of AC input power from a primary power source;
    responsive to detecting the presence of the AC input power and during a positive portion of the AC input power, storing energy from the primary power source in an inductor through a first current path of a power conversion circuit that includes a first switch device, a second switch device, and the inductor;
    responsive to detecting the presence of the AC input power and during a negative portion of the AC input power, storing energy from the primary power source in the inductor through a second current path of the power conversion circuit that includes a first switch device, a second switch device and the inductor:
    detecting a loss of the AC input power from the primary power source;
    responsive to detecting the loss of the AC input power, closing a bypass relay coupled in parallel to the second switch device to bypass the second switch device; and
    responsive to detecting the loss of the AC input power, storing energy from a secondary power source in the inductor, and converting the energy stored in the inductor to a negative DC output voltage through a third current path of the power conversion circuit that excludes the second switch device.

13. The method of claim 12, further comprising, responsive to detecting the loss of the AC input power, storing energy from the secondary power source in the inductor, and converting the energy stored in the inductor to a positive DC output voltage through a fourth current path of the power conversion circuit that excludes the first switch device and the second switch device.

14. The method of claim 12, wherein the power conversion circuit includes a boost converter circuit, and wherein the method further comprises converting power stored in the inductor into a positive DC output voltage using the boost converter circuit.

15. The method of claim 14, wherein the boost converter circuit is a first boost converter circuit, wherein the power conversion circuit includes a second boost converter circuit, and wherein the method further comprises converting power stored in the inductor into a negative DC output voltage using the second boost converter circuit.

* * * * *